J. M. SMITH.
Plow Colter.

No. 106,966. Patented Aug. 30, 1870.

Witnesses.
Harry King
C. L. Evert

Inventor.
Justin M. Smith
per
Alexander Mason
Attys.

United States Patent Office.

JUSTIN MALANCEN SMITH, OF HADDAM, CONNECTICUT.

Letters Patent No. 106,966, dated August 30, 1870.

IMPROVEMENT IN PLOWS.

The Schedule referred to in these Letters Patent and making part of the same.

*To all whom it may concern:*

Be it known that I, JUSTIN MALANCEN SMITH, of Haddam, in the county of Middlesex and in the State of Connecticut, have invented certain new and useful Improvements in Plows; and do hereby declare that the following is a full, clear, and exact description thereof, reference being had to the accompanying drawing and to the letters of reference marked thereon, making a part of this specification.

The nature of my invention consists—

First, in the construction and mode of attaching the colter to plows;

Second, in the construction and arrangement of a flange or wing attached to the upper corner of the mold-board; and Third, in forming teeth upon the edge or side of the plowshare.

In order to enable others skilled in the art to which my invention appertains to make and use the same, I will now proceed to describe its construction and operation, referring to the annexed drawing, in which—

Figure 1:
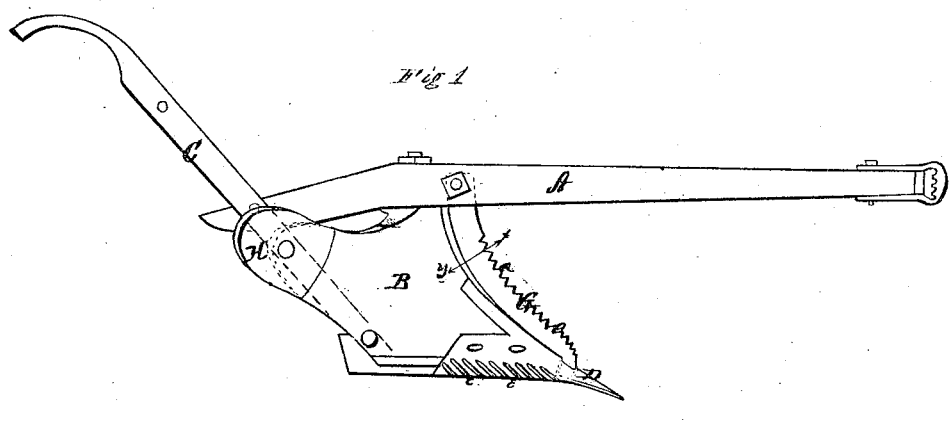

Figure 1 is a side view; and

Figure 2:
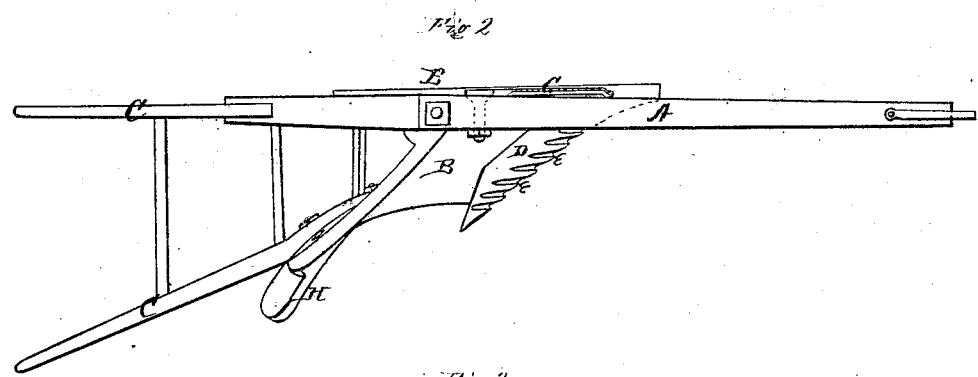
Figure 3:

Figure 2, a plan view of my plow;

Figure 3 is a cross-section of the colter through line $x\,y$, fig. 1.

A represents the plow-beam;

C C, the handles;

B, the mold-board;

D, the share or point;

E, the land-side; and

G, the colter of the plow.

The colter G is inserted with its lower end into a mortise through the plow-point or share D, and its upper end secured to the plow-beam A in such manner that the colter will, for one third or more of its length from the point upward, rest upon the plow, thereby giving it support and preventing it from breaking.

Its upper or cutting-edge is made to lie as nearly as possible to a parallel line with the upper edge of the point or share and the mold-board upon which it rests, thereby giving to the colter a sliding and easy cutting-stroke.

The edge of the colter G is formed with teeth, $a\,a$, which strike into roots and other hard substances, such as frozen earth, and hold them in such manner as to prevent them from drawing across the edge and away from the plow, as is the case with other colters made without teeth; and, while the roots and other obstructions still rest and are firmly held in their natural bed and the earth is not yet loosened or raised by the plow, the colter, reaching forward, slides along under the roots or frozen earth, and other obstructions, cutting them off, at the same time cutting the earth for the furrow-slice, in the same manner that saws cut wood and other substances.

The furrow-slice is thus smoothly and evenly cut without tearing or breaking, as is the case in using other colters, or plows without a colter, and will be the more easily raised by the plow, and, not being broken in any part, it will readily turn over and not be liable to fall onto the land and make bad work.

The teeth $a\,a$ on my colter are formed and maintained in their proper condition for use by cutting a groove, $i$, between the teeth, back on the colter, nearly through its thickness, as shown in fig. 3, leaving a thin web or flange by which they are connected, which web wears off in a manner corresponding with the wear of the teeth at their points, thus maintaining the teeth at all times in their proper shape and condition for cutting roots, &c., as the colter wears away by use.

At the top and back corner of the mold-board B, is attached a wing or flange extension, H, which is formed as shown, and extends outward in such a manner as to increase the breadth of the plow at the top and back end of the mold-board, and not increase the width at the bottom, which increased breadth, as described, assists in turning over the furrow, as will be hereinafter set forth.

It is also curved forward from a vertical line and on a horizontal line more than the mold-board to which it is attached.

The mold-board extension H is such that any plow, suitable for plowing cultivated grounds or grounds composed of a soft soil, may be adjusted so as to plow any kind of soil in any condition or circumstances.

By attaching the wing, the breadth of the plow at the top of the mold-board will be increased, as aforesaid, and the necessary curve of the same is carried outward and forward, as described, over the rising edge of the furrow-slice in such manner as to lay it over easily and readily in the desired position.

When soft soil or cultivated ground is to be plowed, the wing is to be taken off from the mold-board, and the bolt, used in securing it, returned to place, and the plow is again ready for use, thereby enabling the operator at all times to adjust the plow to any kind of work, and in any manner that may be desired.

The edge of the plow share D is provided with teeth, $e\,e$, constructed in the same manner as the teeth $a\,a$ in the colter, before described, and operate in the same manner for the purpose of cutting the roots of grass, especially prairie grass, &c.

Having thus fully described my invention;

What I claim as new, and desire to secure by Letters Patent, is—

1. The colter G, constructed as described, with teeth *a a*, and grooves *i i*, and attached to a plow, substantially in the manner and for the purposes herein set forth.

2. The arrangement with the mold-board B, of the wing H, point D with teeth *e e*, and the colter G with teeth *a a* and grooves *i i*, all substantially as set forth.

In testimony that I claim the foregoing, I have hereunto set my hand and seal this 8th day of April, 1870.

JUSTIN MALANCEN SMITH. [L. S.]

Witnesses:
 DANL. PORTER SMITH,
 E. J. SMITH.